United States Patent
Totolos, Jr. et al.

(10) Patent No.: US 7,840,837 B2
(45) Date of Patent: Nov. 23, 2010

(54) SYSTEM AND METHOD FOR PROTECTING MEMORY DURING SYSTEM INITIALIZATION

(75) Inventors: George Totolos, Jr., Sunnyvale, CA (US); Roger Blood, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 808 days.

(21) Appl. No.: 11/741,373

(22) Filed: Apr. 27, 2007

(65) Prior Publication Data
US 2008/0270776 A1   Oct. 30, 2008

(51) Int. Cl.
G06F 11/00 (2006.01)

(52) U.S. Cl. ............... 714/6; 714/24; 714/22; 714/36; 714/14; 713/2

(58) Field of Classification Search ............ None
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |

(Continued)

OTHER PUBLICATIONS

Bultman, David L., High Performance SCSI Using Parallel Drive Technology, In Proc. BUSCON Conf., pp. 40-44, Anaheim, CA, Feb. 1988.

(Continued)

*Primary Examiner*—Christopher S McCarthy
(74) *Attorney, Agent, or Firm*—Cesari and McKenna, LLP (57) ABSTRACT

A system and method for protecting memory during system initialization is provided. A complex programmable logic device (CPLD) is operatively interconnected with a multiplexer to enable control of a memory to be switched between a memory controller and the CPLD in response to error conditions. If an error condition is identified, the CPLD assumes control of the memory and activates a battery subsystem to provide memory refreshes until system re-initialization. Upon system bring-up, interactions between the BIOS and CPLD assure that protected memory is fully recovered by the system. The contents of memory will remain protected from any further faults that may occur during the bring-up sequence.

28 Claims, 6 Drawing Sheets

U.S. PATENT DOCUMENTS

| | | | |
|---|---|---|---|
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |
| 5,128,810 A | 7/1992 | Halford |
| 5,148,432 A | 9/1992 | Gordon et al. |
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,274,799 A | 12/1993 | Brant et al. |
| 5,305,326 A | 4/1994 | Solomon et al. |
| 5,313,626 A | 5/1994 | Jones et al. |
| 5,351,246 A | 9/1994 | Blaum et al. |
| 5,355,453 A | 10/1994 | Row et al. |
| 5,410,667 A | 4/1995 | Belsan et al. |
| 5,414,861 A | 5/1995 | Horning |
| 5,463,766 A | 10/1995 | Schieve et al. |
| 5,485,579 A | 1/1996 | Hitz et al. |
| 5,537,567 A | 7/1996 | Galbraith et al. |
| 5,579,475 A | 11/1996 | Blaum et al. |
| 5,596,708 A | 1/1997 | Weber |
| 5,623,595 A | 4/1997 | Bailey |
| 5,802,366 A | 9/1998 | Row et al. |
| 5,805,788 A | 9/1998 | Johnson |
| 5,812,753 A | 9/1998 | Chiariotti |
| 5,819,292 A | 10/1998 | Hitz et al. |
| 5,862,158 A | 1/1999 | Baylor et al. |
| 5,884,098 A | 3/1999 | Mason, Jr. |
| 5,918,001 A | 6/1999 | Ueno et al. |
| 5,931,918 A | 8/1999 | Row et al. |
| 5,941,972 A | 8/1999 | Hoese et al. |
| 5,956,475 A | 9/1999 | Burckhartt et al. |
| 5,963,962 A | 10/1999 | Hitz et al. |
| 5,974,544 A | 10/1999 | Jeffries et al. |
| 5,974,546 A | 10/1999 | Anderson |
| 6,012,130 A | 1/2000 | Beyda et al. |
| 6,014,744 A | 1/2000 | McKaughan et al. |
| 6,038,570 A | 3/2000 | Hitz et al. |
| 6,065,037 A | 5/2000 | Hitz et al. |
| 6,092,215 A | 7/2000 | Hodges et al. |
| 6,138,125 A | 10/2000 | DeMoss |
| 6,138,201 A | 10/2000 | Rebalski |
| 6,158,017 A | 12/2000 | Han et al. |
| 6,189,114 B1 | 2/2001 | Orr |
| 6,223,300 B1 | 4/2001 | Gotoh |
| 6,233,108 B1 | 5/2001 | Inoue |
| 6,282,670 B1 | 8/2001 | Rezaul Islam et al. |
| 6,336,174 B1 * | 1/2002 | Li et al. ..................... 711/162 |
| 6,425,035 B2 | 7/2002 | Hoese et al. |
| 6,434,711 B1 | 8/2002 | Takiyanagi |
| 6,442,711 B1 | 8/2002 | Sasamoto et al. |
| 6,477,482 B1 | 11/2002 | Maupin et al. |
| 6,532,548 B1 | 3/2003 | Hughes |
| 6,581,185 B1 | 6/2003 | Hughes |
| 6,625,754 B1 | 9/2003 | Aguilar et al. |
| 6,701,464 B2 | 3/2004 | Austen et al. |
| 6,763,456 B1 | 7/2004 | Agnihotri et al. |
| 6,785,807 B1 | 8/2004 | Aguilar et al. |
| 6,807,643 B2 | 10/2004 | Eckardt et al. |
| 6,854,071 B2 | 2/2005 | King et al. |
| 6,950,966 B2 | 9/2005 | Chiquoine et al. |
| 6,993,701 B2 | 1/2006 | Corbett et al. |
| 7,000,146 B2 | 2/2006 | Mackey et al. |
| 7,039,755 B1 * | 5/2006 | Helms ........................ 711/106 |
| 7,055,057 B2 | 5/2006 | Achiwa |
| 7,131,026 B2 | 10/2006 | Denninghoff et al. |
| 7,143,298 B2 * | 11/2006 | Wells et al. .................. 713/300 |
| 7,380,055 B2 * | 5/2008 | Ashmore ..................... 711/112 |
| 7,392,429 B2 * | 6/2008 | Frank et al. ................... 714/24 |
| 7,562,208 B1 | 7/2009 | Reed et al. |
| 2003/0200382 A1 * | 10/2003 | Wells et al. .................. 711/106 |
| 2004/0030668 A1 | 2/2004 | Pawlowski et al. |
| 2004/0049627 A1 | 3/2004 | Piau et al. |
| 2004/0078666 A1 * | 4/2004 | Aasheim et al. ............... 714/24 |
| 2006/0136765 A1 | 6/2006 | Poisner et al. |
| 2007/0168717 A1 * | 7/2007 | Chang et al. ................... 714/14 |
| 2008/0092016 A1 | 4/2008 | Pawlowski |
| 2008/0101147 A1 * | 5/2008 | Amidi ........................ 365/229 |

OTHER PUBLICATIONS

Gibson, Garth A., et al., Coding Techniques for Handling Failures in Large Disk Arrays, Technical Report UCB/CSD 88/477, Computer Science Division, University of California, Jul. 1988.

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al.., Strategic Directions in Storage I/O Issues in Large-Scale Computing, ACM Computing Survey, 28(4):779-93, Dec. 1996.

Hitz, Dave et al., File System Design for an NFS File Server Appliance, Technical Report 3002, Rev. C395, presented Jan. 19, 1994, 23 pages.

Katz, Randy H. et al., Disk System Architectures for High Performance Computing, Proceedings of the IEEE, vol. 77, No. 12, pp. 1842-1858, Dec. 1989.

Patterson, David A., et al., Introduction to Redundant Arrays of Inexpensive Disks (RAID). In IEEE Spring 89 COMPCON San Francisco, IEEE Computer Society Press, Feb. 27-Mar. 3, 1989, pp. 112-117.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

U.S. Appl. No. 11/748,972, entitled System and Method for Protecting the Contents of Memory During Error Conditions, filed May 15, 2007 by George Totolos, 32 pages.

* cited by examiner

SYSTEM AND METHOD FOR PROTECTING MEMORY DURING SYSTEM INITIALIZATION

FIELD OF THE INVENTION

The present invention relates to computer memory systems and, more particularly, to protecting memory during system initialization.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In addition to volatile (system) memory, certain storage systems may also include non-volatile random access memory (NVRAM) that may be utilized to temporarily store received data before the data is committed to final persistent storage, such as disks. By using NVRAM in a storage system, an increase in performance is realized by clients of the storage system during write operations. In conventional storage systems, a storage system may not acknowledge a write request until such time as the data has been persistently stored on disk. By temporarily storing the received write data in persistent NVRAM, write operations may be acknowledged with shorter latency as compared to storing data directly to disks. Furthermore, in such NVRAM equipped storage systems, should an error condition occur, upon initialization of the system the data may be replayed from the NVRAM to disks to bring the disks to a consistent state. Thus, NVRAM enables improved write performance and protection of system memory against data loss during initialization of the storage system.

However, a noted disadvantage of storage systems that use NVRAM is that the added complexity of managing both volatile and nonvolatile memory substantially increases the overall cost of the systems. The increased cost may limit such systems from certain market segments including, e.g., lower-end small and medium businesses. Thus, the use of NVRAM in storage systems purchased by small and medium businesses has been impractical. The added cost also prohibits storage system vendors from manufacturing storage systems that include NVRAM at an appropriate price point for such lower end systems.

SUMMARY OF THE INVENTION

The present invention overcomes the disadvantages of the prior art by providing a system and method for protecting system memory during initialization of a system, such as a storage system. The storage system includes a customizable programmable logic device (CPLD) that interfaces with a basic input output system (BIOS) for ensuring that the system memory is maintained and refreshed in the event of an abnormal shutdown to therefore enable data to be replayed to persistent storage upon system initialization. In the event of a normal shutdown operation, the CPLD may deactivate a battery system, thereby prolonging battery life. Thus, the CPLD ensures that the memory is protected, i.e., refreshed, only when data needs to be maintained.

During system initialization, the CPLD initially sets a GRANT signal to the BIOS. The BIOS begins initialization and waits until clocks have stabilized. Once the clocks are stabilized the BIOS sets an ENABLE signal to the CPLD. In response the CPLD clears its GRANT signal and, as an acknowledgment, the BIOS clears the ENABLE signal. At this point, the BIOS determines whether a VALID signal is set. If it is not set, then a clean shutdown operation had previously occurred and the CPLD is not currently protecting the contents of memory. In response, the BIOS initializes a memory interface before loading an operating system to begin execution. However if the VALID signal has been set, the BIOS first restores a set of chipset registers before setting a REQUEST signal. In response, the CPLD sets a GRANT signal and the BIOS clears the REQUEST signal as an acknowledgment.

Once initialized, the operating system determines whether the VALID signal has been set. If the VALID signal has not been set, then the CPLD is not protecting any data contained within the memory and the operating system therefore sets the REQUEST signal which causes the CPLD to set the VALID signal. The operating system then clears the REQUEST signal and continues system initialization. However if during initialization the VALID signal is set, then the CPLD is currently protecting the contents of the memory and the operating system validates those memory contents before replaying data stored in the memory to disk (or another storage device) for persistent storage.

Upon detecting a shutdown operation, the CPLD, determines whether or not the shutdown is a "clean" shutdown. In response to determining that it is a clean shutdown, the operating system flushes data to disk and then sets a DISARM signal. The CPLD then clears the VALID signal signifying that it is not currently protecting memory. The operating system thereafter clears the DISARM signal and the system powers down. However, if a clean shutdown is not detected, then the CPLD takes control of the system memory from a memory controller. The CPLD then places the memory into a self refresh mode using a battery subsystem to provide power refresh operations.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

The present invention provides a system and method for protecting system memory during initialization of a system, such as a storage system. The storage system includes a CPLD that interfaces with a BIOS for ensuring that the system memory is maintained and refreshed in the event of an abnormal shutdown to therefore enable data to be replayed to persistent storage upon system initialization. In the event of a normal shutdown operation, the CPLD may deactivate a battery system, thereby prolonging battery life. Thus, the CPLD ensures that the memory is protected, i.e., refreshed, only when data needs to be maintained over a power cycle. As can be appreciated by one skilled in the art, the present invention enables all system faults that may possibly affect the contents of the memory to be trapped by the CPLD so that appropriate action may be taken to prevent data corruption of the memory.

A. Storage System Environment

Figure 1:
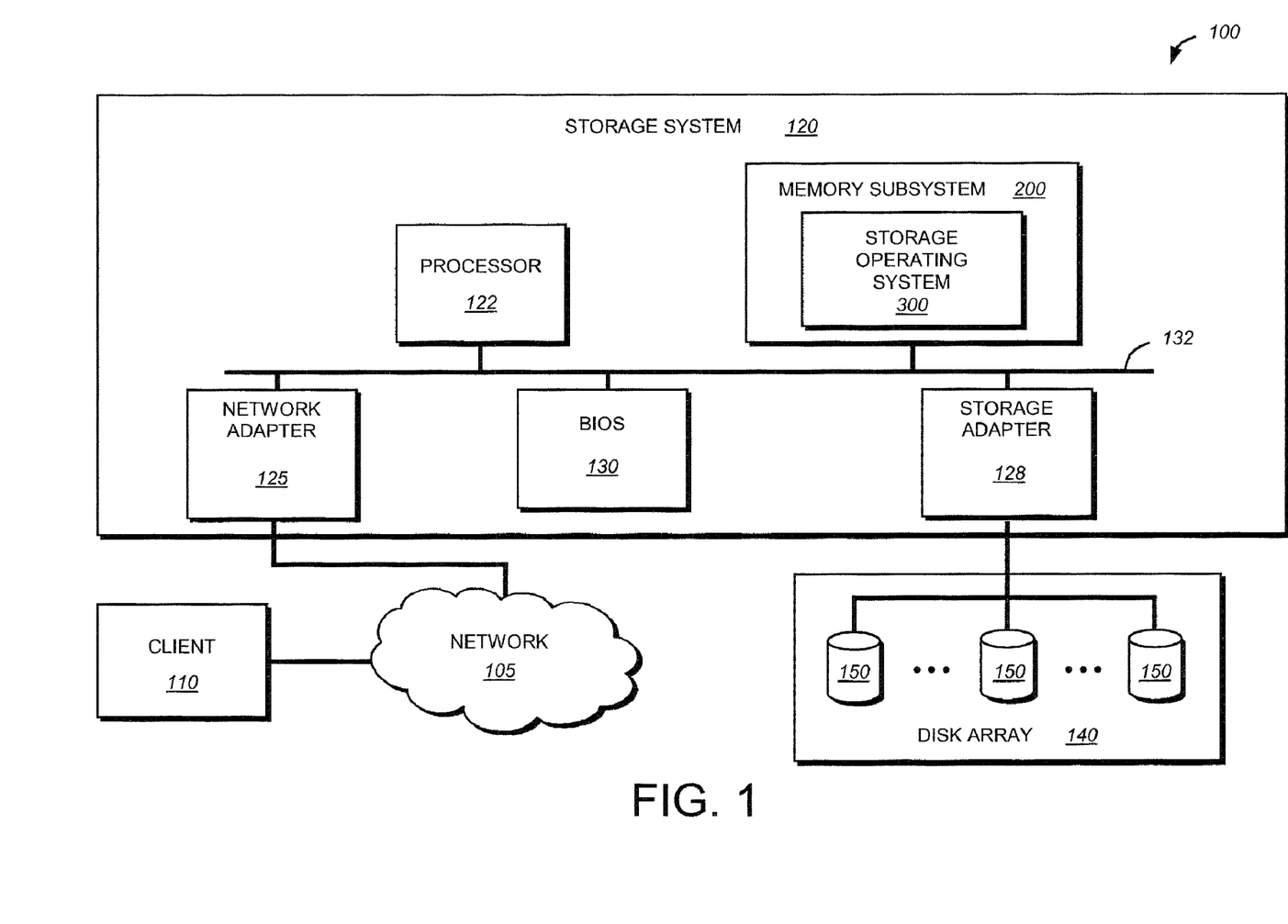
FIG. 1 is a schematic block diagram of an exemplary storage system environment in accordance with an illustrative embodiment of the present invention.

FIG. 1 is a schematic block diagram of an environment 100 including a storage system 120 that may be advantageously used with the present invention. The inventive technique described herein may apply to any type of special-purpose (e.g., file server) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 120 comprises a processor 122, a memory subsystem 200, a network adapter 125, a storage adapter 128 and a basic input output system (BIOS) 130 interconnected by a system bus 132. The memory subsystem 200 includes a system memory, described further below, comprising storage locations that are addressable by the processor and adapters for storing software program code and data structures associated with the present invention. The processor and adapters may, in turn, comprise processing elements and/or logic circuitry configured to execute the software code and manipulate the data structures. A storage operating system 300, portions of which are typically resident in the system memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 125 comprises a plurality of ports adapted to couple the storage system 120 to one or more clients 110 over point-to-point links, wide area networks, virtual private networks implemented over a public network (Internet) or a shared local area network (hereinafter "network 105"). The network adapter 125 thus may comprise the mechanical, electrical and signaling circuitry needed to connect the storage system to the network 105, such as a computer network. Illustratively, the network 105 may be embodied as an Ethernet network or a Fibre Channel (FC) network. Each client 110 may communicate with the storage system 120 over network 105 by exchanging discrete frames or packets of data according to pre-defined protocols, such as TCP/IP.

The storage adapter 128 cooperates with the storage operating system 300 executing on the system 120 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 150, such as HDD and/or DASD, of array 140. The storage adapter includes input/output (I/O) interface circuitry that couples to the disks over an I/O interconnect arrangement, such as a conventional high-performance, FC serial link topology.

Storage of information on array 140 is preferably implemented as one or more storage "volumes" that comprise a cluster of physical storage disks 150, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

B. Memory Subsystem

Figure 2:
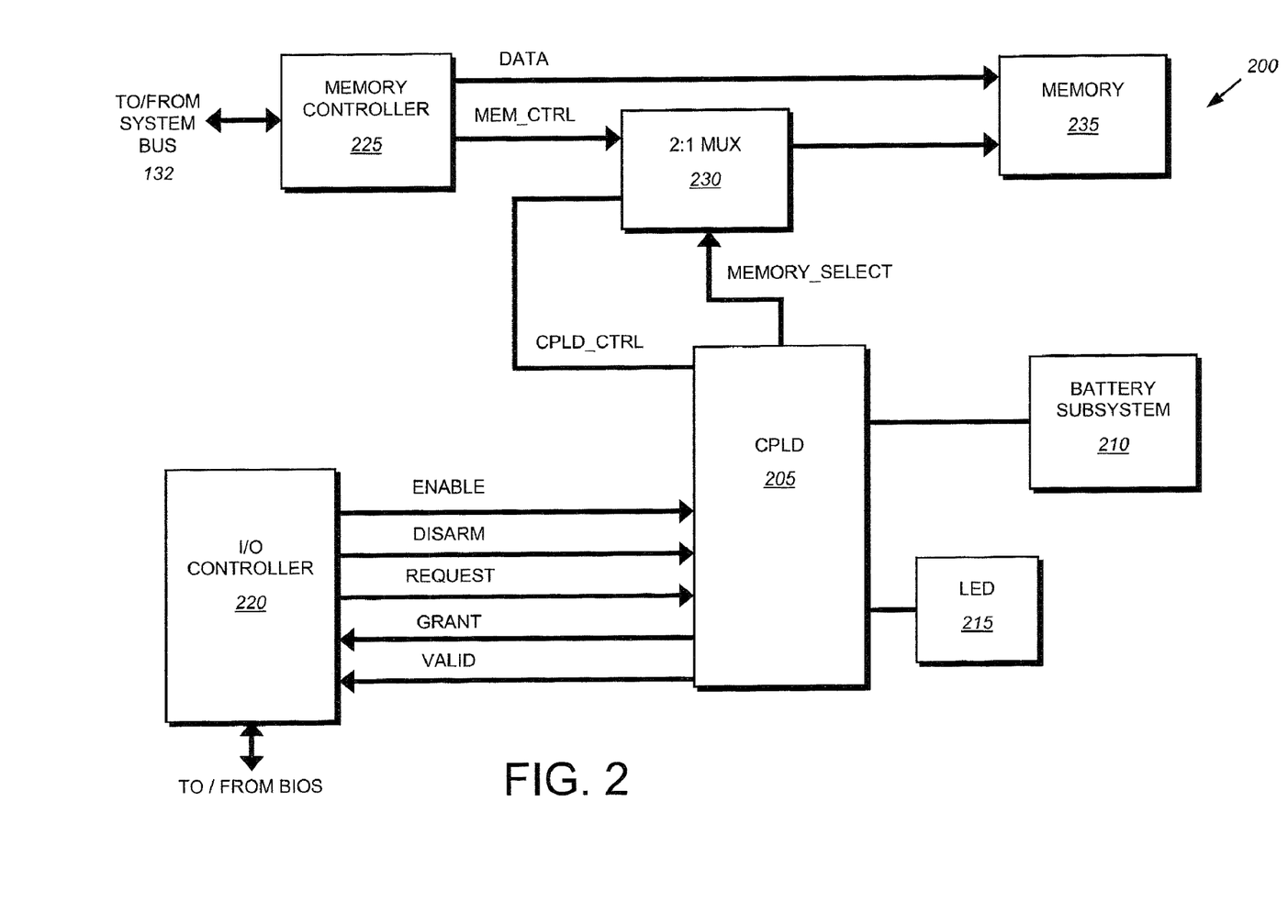
FIG. 2 is a schematic block diagram of an exemplary memory subsystem of a storage system in accordance with an illustrative embodiment of the present invention.

FIG. 2 is a schematic block diagram of an exemplary memory subsystem 200 in accordance with an illustrative embodiment of the present invention. The memory subsystem 200 includes a customizable programmable logic device (CPLD) 205 that monitors the "health" of the storage system for events that may put the memory subsystem at risk, e.g. a system reset and/or power loss. Illustratively, the CPLD 205 may be implemented as a FPGA; however, in alternate embodiments the CPLD may be implemented using other forms of hardware, software, firmware or a combination thereof. Operatively interconnected with the CPLD 205 are a battery subsystem 210 and a light emitting diode (LED) 215. The battery subsystem 210 illustratively comprises one or more batteries and/or related circuitry for providing power refresh operations to a system memory 235 when the main power of the storage system has been disconnected. Illustratively, the system memory may comprise of one or more DIMMs, however, in alternate embodiments the memory 235 may be implemented using other form factors. The LED 215, which may comprise an LED or other form of signal indicator, is utilized by the memory subsystem 200 to indicate to administrators when the CPLD 205 is currently protecting system memory 235. Thus, for example, in the event of a power loss, if the CPLD 205 is protecting memory 235, the LED 215 may be illuminated to indicate to an administrator that operations that impact the validity of data in the memory subsystem should not be performed, e.g., replacing physical memory modules, such as DIMMS, etc.

The CPLD 205 is also operatively interconnected with a 2:1 multiplexer (MUX), 330, which controls access to the memory 235 between the CPLD 205 and a memory controller 225. In accordance with an illustrative embodiment of the invention, the MUX 230 may be implemented as a field effect transistor (FET). However, it should be noted that the MUX 230 may be implemented using non-FET techniques. As such, the description of MUX 230 being implemented as a FET should be taken as exemplary only. Illustratively, the memory controller 225 is a conventional memory controller for the storage system that enables access to the system memory 235 by the processor 122 and/or other devices, e.g. adapters 125, 128. The memory controller 225 is coupled to the system memory 235 over a DATA bus to enable performance of storage and retrieval operations to/from the memory 235. The memory controller 225 is further coupled to a first data input of the MUX 230 over a MEM_CTRL line to enable issuance of operations to the memory. Similarly, the CPLD 205 is coupled to a second data input of the MUX 230 over a CPLD_CTRL line as well as to a control input of the MUX over a MEMORY_SELECT line. The MEMORY_SELECT line enables the CPLD 205 to select among the two data inputs of the MUX 230 to thereby permit either the memory controller 225 or the CPLD 205 to access to the memory 235.

An input/output (I/O) controller 220 is further operatively interconnected with the CPLD 205 and the BIOS. The CPLD 205 and I/O controller 220 illustratively share five signal lines, e.g., ENABLE, DISARM, REQUEST, GRANT and VALID signal lines. The ENABLE signal, which is directed from the I/O controller 220 to the CPLD 205, is generated by the BIOS 130 to signify that the BIOS has initialized to a point where memory clock signals have become stable. The REQUEST signal, which is directed from the I/O controller to the CPLD 205, is also generated by the BIOS to request the CPLD to protect the contents of memory. The GRANT signal, is generated by the CPLD is utilized as a handshake with the BIOS during certain operations, described further below. The VALID signal, is generated by the CPLD and directed to the BIOS to indicate that the CPLD is currently protecting the contents of memory, e.g., by providing self refresh operations to render the memory contents non-volatile. The DISARM signal is generated by the operating system and directed to the CPLD to indicate that a clean shutdown operation is occurring and that all data has been flushed from the memory module and persistently stored on, e.g., disk.

C. Storage Operating System

To facilitate access to the disks, the storage operating system 300 implements a write-anywhere file system that cooperates with virtualization modules to provide a function that "virtualizes" the storage space provided by disks. The file system logically or ganizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named virtual disks (vdisks) on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
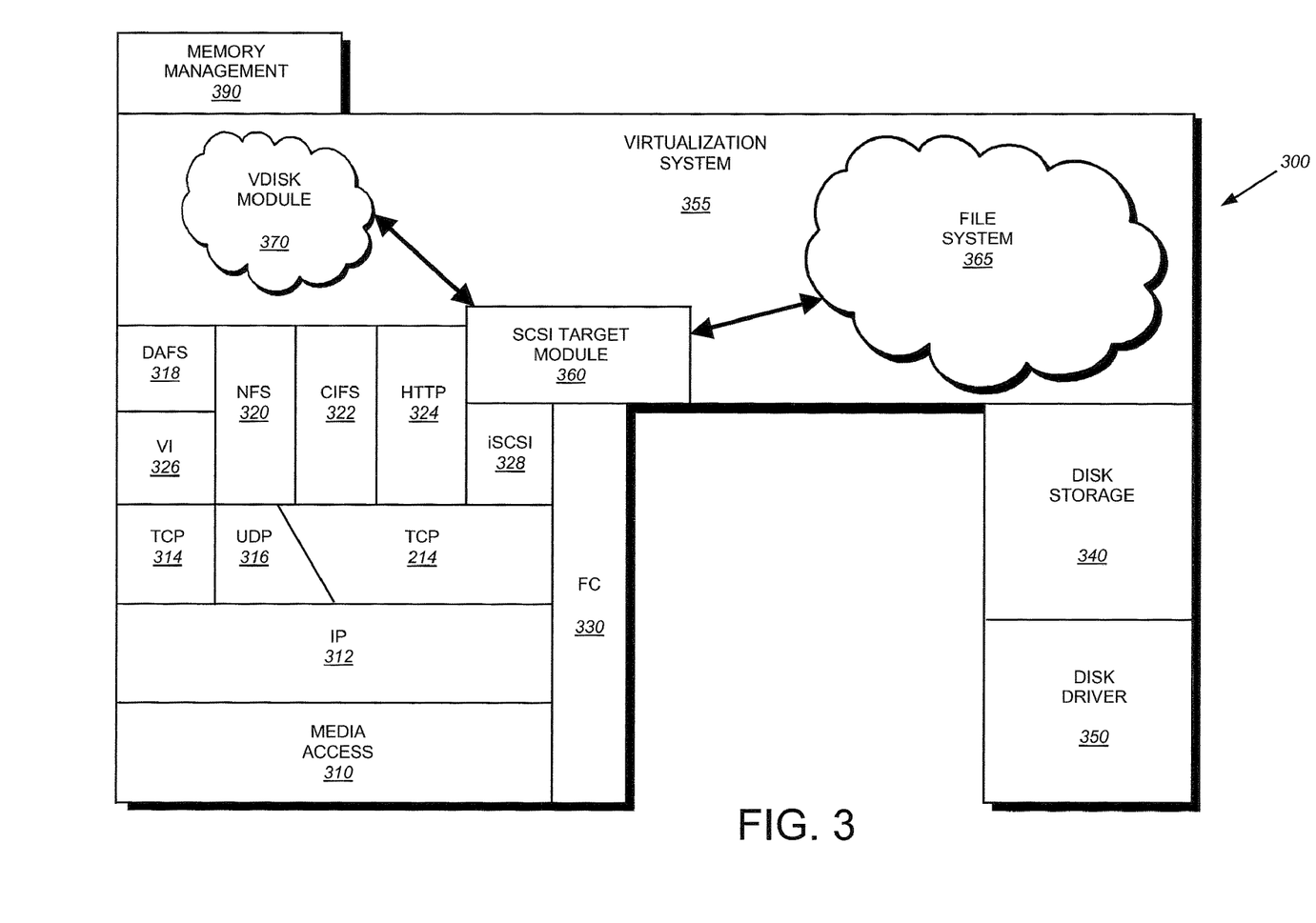
FIG. 3 is a schematic block diagram of an exemplary storage operating system for use on a storage system in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the Network File System (NFS) protocol 320, the Common Internet File System (CIFS) protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the network adapter to receive and transmit block access requests and responses to and from the storage system. The FC and iSCSI drivers provide FC-specific and iSCSI-specific access control to the luns (vdisks)

and, thus, manage exports of vdisks to either iSCSI or FCP or, alternatively, to both iSCSI and FCP when accessing a single vdisk on the storage system. In addition, the storage operating system includes a disk storage layer 340, such as a RAID system, that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage system 120. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 330, 328 and the file system 365 to thereby provide a translation layer of the virtualization system 355 between the SAN block (lun) space and the file system space, where luns are represented as vdisks. By "disposing" SAN virtualization over the file system 365, the multi-protocol storage system reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

Operationally, a request from the client 110 is forwarded as a packet over the computer network 105 and onto the storage system 120 where it is received at the network adapter 125. A network driver processes the packet and, if appropriate, passes it on to a network protocol and file access layer for additional processing prior to forwarding to the write-any-where file system 365. Here, the file system generates operations to load (retrieve) the requested data from disk 150 if it is not resident "in-core," i.e., in the memory subsystem 200. If the information is not in the memory, the file system 365 indexes into the inode file using the inode number to access an appropriate entry and retrieve a logical volume block number (vbn). The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 150 and loads the requested data block(s) in memory for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapter 125, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

Figure 5:
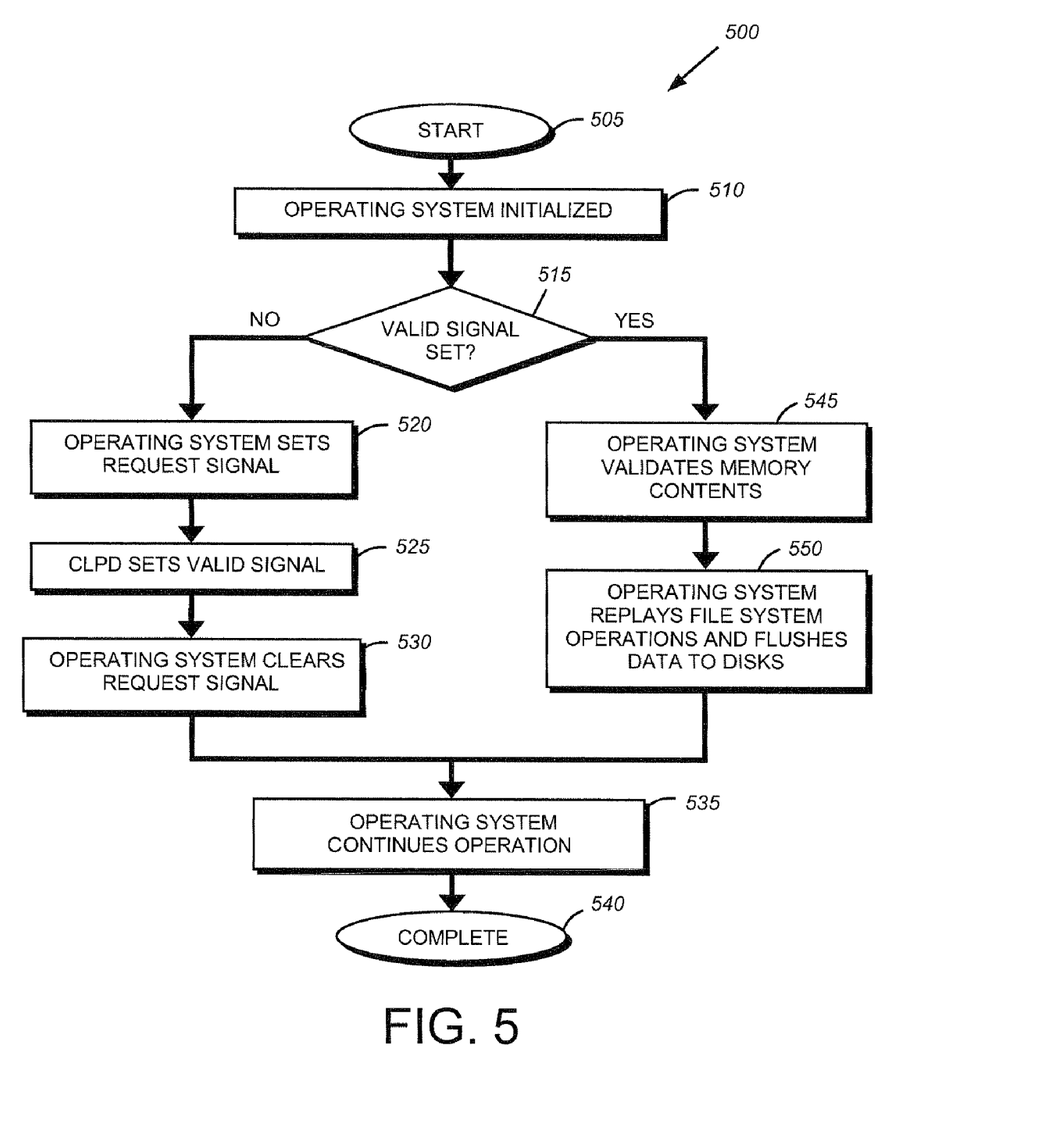
FIG. 5 is a flow chart detailing the steps of a procedure for initializing an operating system in accordance with an illustrative embodiment of the present invention.

A memory management module 390 of the storage operating system 300 illustratively interfaces with the BIOS 130 and/or CPLD 205 to ensure that data maintained in system memory 235 is persistently stored during a system initialization. The memory management module 390 illustratively performs system memory management, such as that described further below in reference to procedure 500 (FIG. 5).

As used herein, the term "storage operating system" generally refers to the computer-executable code operable to perform a storage function in a storage system, e.g., that manages data access and may implement file system semantics. In this sense, the Data ONTAP software is an example of such a storage operating system implemented as a microkernel and including a file system layer to implement file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage system) or general-purpose computer, including a standalone computer or portion thereof, embodied as or including a storage system 120. An example of a storage system that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, by Brian Pawlowski, et al., filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

D. Memory Protection

The present invention provides a system and method for protecting system memory during initialization of a system, such as a storage system. The storage system includes a CPLD that interfaces with a BIOS for ensuring that the system memory is maintained and refreshed in the event of an abnormal shutdown to therefore enable data to be replayed to persistent storage upon system initialization. In the event of a normal shutdown operation, the CPLD may deactivate a battery system, thereby prolonging battery life. Thus, the CPLD ensures that the memory is protected, i.e., refreshed, only when data needs to be maintained over a power cycle.

During system initialization, the CPLD initially sets a GRANT signal to the BIOS. The BIOS begins initialization and waits until clocks have stabilized. Once the clocks are stabilized the BIOS the sets an ENABLE signal to the CPLD. In response the CPLD clears its GRANT signal and, as an acknowledgment, the BIOS clears the ENABLE signal. At this point, the BIOS determines whether a VALID signal is set. If it is not set, then a clean shutdown operation had previously occurred and the CPLD is not currently protecting the contents of memory. In response, the BIOS initializes a memory interface before loading an operating system to begin execution. However if the VALID signal has been set, the BIOS first restores a set of chipset registers to re-enable the system memory interface without modifying and/or initializing the contents of the memory before setting a REQUEST signal. This is in distinction to normal operation where the BIOS initializes the memory, thereby clearing data stored therein.

Once initialized, the operating system determines whether the VALID signal has been set. If the VALID signal has not been set, then the CPLD is not protecting any data contained within the memory and the operating system therefore sets the REQUEST signal which causes the CPLD to set the VALID signal, thus arming the non-volatile memory (NVMEM) subsystem. The operating system then clears the REQUEST signal and continues system initialization. However, if during initialization of the system the VALID signal is set, then the CPLD is currently protecting the contents of the memory and the operating system validates these memory contents before replaying data stored in the memory to disk (or another storage device) for persistent storage.

To shut down the system cleanly, the operating system flushes data to disk and then sets a DISARM signal. The CPLD then clears the VALID signal to signify that it is nor currently protecting memory. When the system finally halts, the disarmed CPLD will ignore the fault conditions and let the system shut down without activating the battery. However, if a fault occurs during normal operation, then the CPLD takes control of the system memory from a memory controller. The CPLD then places the memory into a self refresh mode using a battery subsystem to provide power refresh operations. Thus, the present invention enables switching control of a memory bus between the CPLD and the system to prevent invalid and/or damaging commands from being transmitted to the memory. Furthermore, the present invention ensures that required refresh operations to the memory are not missed. As can be appreciated by one skilled in the art, missing a refresh operation may cause memory corruption and/or data loss.

Figure 4:
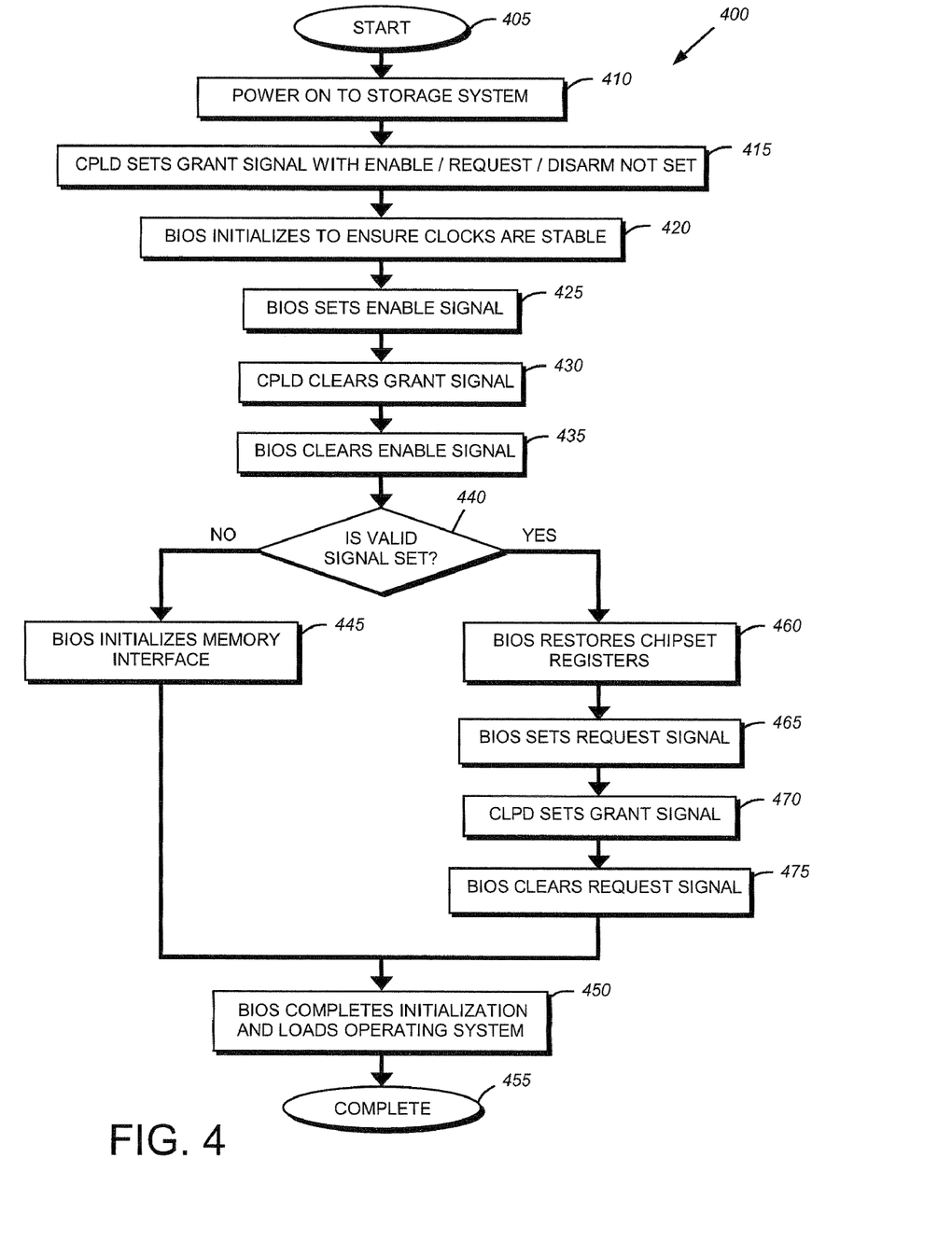
FIG. 4 is a flow chart detailing the steps of a procedure for initializing a storage system in accordance with an illustrative embodiment of the present invention.

FIG. 4 is a flow chart detailing the steps of a procedure 400 for initializing a storage system in accordance with an illustrative embodiment of the present invention. As noted, the present invention provides a technique for controlling operations between the BIOS and system hardware to provide guarantees that a system fault during an initialization of the system will not cause corruption of data stored within the memory. The procedure 400 begins in step 405 and continues to step 410 where power is first applied to the storage system. This may be due to, e.g., a storage system first being plugged in, a restart of a storage system, etc. In step 415, the CPLD sets the GRANT signal while the BIOS 130 ensures that the ENABLE, REQUEST and DISARM signals are not set. The VALID signal may or may not be set depending on whether the CPLD is currently protecting the contents of the memory, as described further below. The BIOS 130 then initializes to ensure that clocks are stable in step 420. Ensuring that the clocks are stable is important to enable proper memory refresh operations once the memory controller 225 assumes control over the memory 235. Once the clocks have been deemed to be stable, the BIOS 130 then sets the ENABLE signal in step 425. In response, the CPLD clears the GRANT signal in step 430. As an acknowledgment, the BIOS 130 clears the ENABLE signal in step 435. The BIOS then determines whether the VALID signal is set in step 440. If the VALID signal is not set, then the procedure branches to step 445 where the BIOS initializes the memory interface. Illustratively, the VALID signal may be set in response to an improper shutdown, i.e., to indicate that the CPLD is protecting memory. Once the BIOS 130 initializes the memory interface, the BIOS completes initialization and loads the operating system in step 450. Once the operating system has been loaded, the procedure 400 completes in step 455.

However, if in step 440 the VALID signal is set then the procedure 400 branches to step 460 where the BIOS restores a set of chipset registers. Illustratively, the chipset registers identify the current state of the memory. The chipset register contents may have been saved by the BIOS into persistent storage during normal initialization operations. Once the registers have been set and the memory controller is enabled, the BIOS sets the REQUEST signal in step 465. In response, the CPLD 205 switches memory from CPLD to system control and sets the GRANT signal in step 470. In step 475, the BIOS then clears the REQUEST signal before proceeding to step 450 to complete initialization and load the operating system.

FIG. 5 is a flow chart detailing the procedures in the steps of a procedure 500 for initializing an operating system in accordance with an illustrative embodiment of the present invention. The procedure 500 begins in step 505 and continues to step 510 where the operating system is initialized. The operating system may be initialized by, e.g., the BIOS 130 loading the appropriate portions of the operating system and passing execution to the operating system. As used herein, the term operating system should be taken to include storage operating systems and/or any other forms of operating systems, including e.g., virtual machine software, etc. Once the operating system has been initialized, the operating system determines whether the VALID signal is set in step 515. The operating system may make this determination via, e.g., a memory management module 390. If the VALID signal is not set, which indicates that the memory is not in a protected state, the procedure branches to step 520 where the operating system sets the REQUEST signal. In response, the CPLD 205 sets the VALID signal in step 525 indicating that it is prepared to ensure that data is protected within the memory. The operating system then clears the REQUEST signal in step 530 and continues operations at 535. The procedure completes in step 540.

However, if in step 515 it is determined that the VALID signal is set, thus indicating that the CPLD is currently protecting memory, the procedure branches to step 545 where the operating system validates the memory contents. This may occur by, e.g., the operating system verifying checksum information in memory, etc. In step 550, the operating system replays file system operations and flushes data to disks or other persistent storage before proceeding to step 535 and 540. It should be noted that in accordance with alternate embodiments of the present invention the operating system may perform additional and/or differing operations. As such, the description of replaying file operation should be taken as exemplary only.

Figure 6:
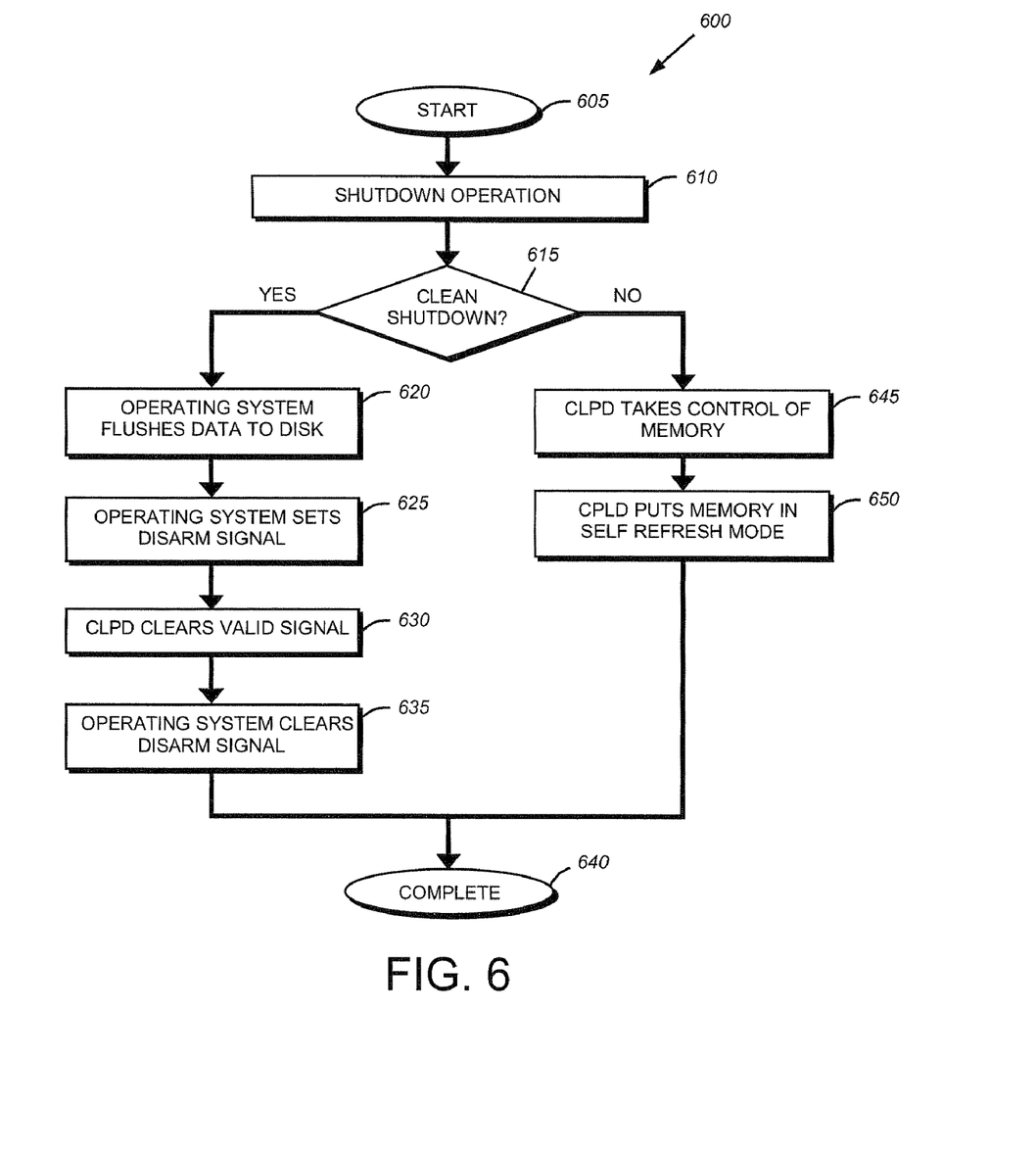
FIG. 6 is a flow chart detailing the steps of a procedure for powering off a storage system in accordance with an illustrative embodiment of the present invention.

FIG. 6 is a flow chart detailing the steps of a procedure 600 for performing a shutdown operation in accordance with an illustrative embodiment of the present invention. The procedure 600 begins in step 605 and continues to step 610 where a shutdown operation occurs. Illustratively, the shutdown operation may include, e.g., a loss of power, an administrator invoked shutdown, etc. In step 615 a determination is made whether the shutdown operation is a clean shutdown, i.e., whether the shutdown is a result of an unexpected error condition or whether it is the result of an administrator initiated action. If the shutdown operation is a clean shutdown, the procedure 600 continues to step 620 where the operating system flushes any data stored in memory to disk or other persistent storage devices, e.g., flash devices, etc. Once the operating system has flushed the appropriate data to disk, the contents of the memory no longer need to be protected as all data has been persistently stored on disk. The operating system then, in step 625, sets the DISARM signal. In response, the CPLD clears the VALID signal in step 630. Consequently, the CPLD will not engage the battery subsystem to refresh the memory, thereby preserving battery life. Memory refresh operations are not necessary as all data has been stored persistently on disk. The operating system then clears the DISARM signal in step 635 before the procedure completes in step 640.

However, if in step 615 it is determined that this is not a clean shutdown, the procedure 600 branches to step 645 where the CPLD takes control of memory. This may be accomplished by sending a signal over the MEMORY_CONTROL line to the MUX 230, thereby switching control from the memory controller to the CPLD. The CPLD also puts the memory in a self refresh mode in step 650 by e.g., activating the battery subsystem to provide power refresh operations to the memory to preserve its contents. Illustratively, when memory comprises memory chips that support such features, the CPLD may place the memory chips into a power conservation mode which reduces the amount of battery power necessary to maintain state. In the illustrative embodiment, once the CPLD has asserted control over the memory and placed it into a self refresh mode, the CPLD may invoke a system reset to cause the system to re-initialize. The procedure then ends at step 640.

The foregoing description has been directed to specific embodiments of this invention. Additionally, the procedures, processes and/or modules described herein may be implemented in hardware, software, embodied as a computer-readable medium having program instructions, firmware, or a combination thereof. For example, while the term operating system is used herein, the principles of the present invention apply to storage operating systems, etc. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for protecting memory, the method comprising:
  initializing a computer system comprising the memory and an operating system;
  determining whether the memory is being protected by a memory subsystem and determining whether the memory is currently storing preserved data;
  in response to determining that the memory is not being protected by the memory subsystem and the memory is not storing preserved data, initializing the memory, loading the operating system, and setting a signal to cause the memory subsystem to persistently maintain contents of the memory during an error condition of the computer system; and
  in response to determining that the memory is being protected by the memory subsystem and the memory is storing preserved data, restoring a set a of chipset registers of the computer system without initializing the memory, loading the operating system, and persistently storing the stored data on a storage device.

2. The method of claim 1 wherein the storage device comprises a disk.

3. The method of claim 1, wherein initializing the memory further comprises:
  detecting a clean shutdown operation;
  flushing data stored in the memory to the storage device; and
  deactivating the signal, thereby causing the memory subsystem to cease preserving contents of the memory.

4. The method of claim 3 wherein causing the memory subsystem to cease preserving contents of the memory further comprises deactivating a battery subsystem.

5. The method of claim 1 wherein the memory subsystem comprises the memory and a battery subsystem.

6. The method of claim 1 further comprising:
  detecting a shutdown operation that is not a clean shutdown operation; and
  placing the memory into a self refresh mode to preserve the contents of the memory.

7. The method of claim 6 further comprising switching a multiplexer in a control path of the memory to thereby prevent a memory controller from accessing the memory.

8. The method of claim 6 further comprising changing control of the memory to a customizable programmable logic device to issue commands that place the memory into a low-power mode.

9. The method of claim 1 wherein the computer system comprises a storage system.

10. The method of claim 1 wherein the memory comprises one or more dual inline memory modules (DIMMs).

11. A system for protecting memory, the system comprising:
  means for initializing a computer system comprising the memory and an operating system;
  means for determining whether the memory is being protected by a memory subsystem and whether the memory is currently storing preserved data;
  means for initializing the memory, loading the operating system, and setting a signal to cause a memory subsystem to persistently maintain contents of the memory during an error condition of the computer system in response to determining that the memory is not being protected by the memory subsystem and the memory is not storing preserved data; and means for restoring a set of chipset registers of the computer system without initializing the memory, loading the operating system, and persistently storing the stored data on a storage device, in response to determining that the memory is being protected by the memory subsystem and the memory is storing preserved data.

12. A system to preserve memory, the system comprising:
a customizable program logic device (CPLD) configured to determine whether a shutdown of the system, comprising the memory, is a clean shutdown,
a basic input output system (BIOS) configured to initialize, in response to the shutdown being a clean shutdown, the memory;
in response to the shutdown not being a clean shutdown, the memory switchable between a memory controller and the CPLD, the CPLD further coupled to a battery subsystem further configured to enable refresh operations to the memory, the CPLD further configured to assume control of the memory and place the memory in a low-power, self-refresh state, wherein during initialization of the system and after the shutdown, the BIOS further configured to restore a set of chip registers associated with the system, and an operating system configured to validate content of the memory and flush data stored in the memory to persistent storage.

13. The system of claim 12 wherein the BIOS is interconnected with the CPLD.

14. The system of claim 13 further comprising a valid signal between the BIOS and the CPLD, the valid signal identifying that the CPLD is protecting contents of the memory.

15. The system of claim 12 wherein the BIOS is further configured to request that control of the memory be changed from the CPLD to the memory controller.

16. The system of claim 15 wherein the CPLD grants control of the memory to the memory controller by modifying a memory select signal to a multiplexer.

17. The system of claim 13 further comprising a disarm signal between the BIOS and the CPLD, the disarm signal configuring the CPLD to ignore error conditions.

18. The system of claim 12 further comprising an indicator configured to alert an administrator when the CPLD has assumed control of the memory.

19. The system of claim 12 wherein the CPLD assumes control of the memory by modifying a memory select signal to a multiplexer.

20. The system of claim 19 wherein the multiplexer comprises a field effect transistor.

21. The system of claim 12 wherein the shutdown not being a clean shutdown is an error condition of a loss of main power.

22. The system of claim 12 wherein the error condition comprises an assertion of a system reset.

23. The system of claim 12 wherein the memory comprises one or more dual in line memory modules (DIMMs).

24. A system to preserve memory, the system comprising:
a memory switchable between a memory controller and a customizable program logic device (CPLD), the CPLD further coupled to a battery subsystem configured to enable refresh operations to the memory, the CPLD further configured to, in response to detecting an error condition, assuming control of the memory and placing the memory in a low-power, self-refresh state; and
an indicator configured to indicate to a user that the CPLD has assumed control of the memory.

25. The system of claim 24 wherein a basic input output system (BIOS) is interconnected with the CPLD.

26. The system of claim 25 further comprising a disarm signal between the BIOS and the CPLD, the disarm signal configuring the CPLD to ignore error conditions.

27. The system of claim 25 further comprising a valid signal between the BIOS and the CPLD, the valid signal identifying that the CPLD is protecting contents of the memory.

28. The system of claim 24 wherein the indicator comprises a light emitting diode (LED).

* * * * *